United States Patent
Sire et al.

(10) Patent No.: US 12,541,375 B2
(45) Date of Patent: Feb. 3, 2026

(54) OPEN JSON PARSER

(71) Applicant: SAP SE, Walldorf (DE)

(72) Inventors: Philippe Sire, Verrières le Buisson (FR); Nicolas Mourey, Fleury en Biere (FR)

(73) Assignee: SAP SE, Walldorf (DE)

( * ) Notice: Subject to any disclaimer, the term of this patent is extended or adjusted under 35 U.S.C. 154(b) by 82 days.

(21) Appl. No.: 18/581,045

(22) Filed: Feb. 19, 2024

(65) Prior Publication Data
US 2025/0217165 A1 Jul. 3, 2025

Related U.S. Application Data

(60) Provisional application No. 63/615,436, filed on Dec. 28, 2023.

(51) Int. Cl.
G06F 9/40 (2006.01)
G06F 9/445 (2018.01)
G06F 16/25 (2019.01)

(52) U.S. Cl.
CPC ........ G06F 9/44505 (2013.01); G06F 16/254 (2019.01)

(58) Field of Classification Search
CPC ........................... G06F 9/44505; G06F 16/254
See application file for complete search history.

(56) References Cited

U.S. PATENT DOCUMENTS

| 2016/0127322 A1* | 5/2016 | Ben-Natan | G06F 21/6254 726/26 |
| 2023/0129541 A1* | 4/2023 | Dissanayake | G06F 3/0482 726/5 |
| 2025/0110919 A1* | 4/2025 | Vasudeva | G06F 16/116 |

FOREIGN PATENT DOCUMENTS

KR 102631536 B1 * 1/2024 ............. G06F 30/20

OTHER PUBLICATIONS

Article entitled "Introduction to JsonPath", by Baeldung, dated Nov. 13, 2023 (Year: 2023).*
Article entitled "JavaScript if, else, and else if", by W3 Schools, dated Dec. 1, 2022 (Year: 2022).*

* cited by examiner

Primary Examiner — Mahesh H Dwivedi
(74) Attorney, Agent, or Firm — SCHWEGMAN LUNDBERG & WOESSNER, P.A.

(57) ABSTRACT

An open JSON parser can be configured to parse different JSON resources without modifying source code. When the format of a JSON resource (e.g., a JSON file) is changed, a corresponding rules file is modified to reflect the change. An application requests data from the JSON resource using an open JSON parser. The open JSON parser uses the rules file for the JSON resource to determine how to retrieve the requested data. By modifying a rules file for an open JSON parser instead of modifying the source code of the application, efforts involved in maintaining applications that make use of JSON resources are reduced.

20 Claims, 12 Drawing Sheets

```
310                DATA.JSON
{
  "data": {
    "storyId": "STORY:t.1:43CD9B0D4311426E",
    "title": "myStory",
    "description": "",
    "content": {
      "version": "2.70",
      "entitites": [...]
    },
    "isOptimizedEnabled": false
  }
}

320                DATA1.RULES
{
  "node": {
    "story": {
      "query": "$.data",
      "specification": {
        "attributes": [
          {
            "name": "id",
            "query": "$.storyId"
          },
          {
            "name": "version",
            "query": "$.content.version"
          }
        ]
      }
    }
  }
}
```

310

```
DATA.JSON
{
 "data": {
   "storyId": "STORY:t.1:43CD9B0D4311426E",
   "title": "myStory",
   "description": "",
   "content": {
     "version": "2.70",
     "entitites": [...]
   },
   "isOptimizedEnabled": false
 }
}
```

320

```
DATA1.RULES
{
 "node": {
   "story": {
     "query": "$.data",
     "specification": {
       "attributes": [
         {
           "name": "id",
           "query": "$.storyId"
         },
         {
           "name": "version",
           "query": "$.content.version"
         }
       ]
     }
   }
 }
}
```

*FIG. 3*

410 — DATA2.RULES

```
{
  "node": {
    "page": {
      "query": "$.data.pages[*]",
      "specification": {
        "attributes": [
          {
            "name": "id",
            "query": "$.id"
          },
        ],
        "node": {
          "widget": {
            "query": "$.widgets[*]",
            "specification": {
              "attributes": [
                {
                  "name": "id",
                  "query": "$.id"
                }
              ]
            }
          }
        }
      }
    }
  }
}
```

*FIG. 4*

510 — DATA3.RULES

```
{
  "node": {
    "widget": {
      "query": "$.data.pages[*].content.widgets[*]",
      "specification": {
        "attributes": [
          {
            "name": "id",
            "query": "$.id"
          },
        ],
      },
      "exemptions": [
        {
          "condition": "$[?(@.class = 'DynamicTableWidget')]",
          "label": "tableWidget",
          "specification": {
            "attributes": [
              {
                "name": "type",
                "query": "$.class",
                "regex": "(?<=\\.)[^\\.]*(?=Widget)"
              },
              {
                "name": "id",
                "query": "$.id"
              }
            ]
          }
        }
      ]
    }
  }
}
```

*FIG. 5*

610 — DATA4.RULES

```
{
  "node": {
    "widget": {
      "query": "$.data.content.entities[0].data.pages[*].content.widgets[*]",
      "specification": {
        "attributes": [
          {
            "name": "id",
            "query": "$.id",
            "scenarios": [
              {
                "statement": "(@=null)?\"=(hash(source+path))\""
              },
              {
                "statement": "(len(@)>16)?\"=(len(@))\""
              }
            ]
          }
        ]
      }
    }
  }
}
```

FIG. 6

OPEN JSON PARSER

PRIORITY CLAIM

This application claims the benefit of priority of U.S. Provisional Patent Application Ser. No. 63/615,436, filed on Dec. 28, 2023, which is hereby incorporated by reference in its entirety.

TECHNICAL FIELD

The subject matter disclosed herein generally relates to parsing data stored in JavaScript Object Notation (JSON). Specifically, the present disclosure addresses systems and methods to using a configurable adapter to read data from and write data to JSON resources.

BACKGROUND

Data in JSON files is typically accessed by specifying a complete JSON path to the data. Any modification to the data structure by the application that writes the data necessitates a corresponding modification to the source code of all applications that access the data. Source code modifications consume software developer resources and implicate modifications of test suites.

BRIEF DESCRIPTION OF THE DRAWINGS

FIG. 3 shows an illustration of a file containing JSON data and a file containing rules for use by an open JSON parser in parsing the JSON data file, according to some example environments.

FIG. 4 shows an illustration of a file containing rules that include a subquery, for use by an open JSON parser in parsing a JSON resource.

FIG. 5 shows an illustration of a file containing rules that include an exemption, for use by an open JSON parser in parsing a JSON resource.

FIG. 6 shows an illustration of a file containing rules that includes a scenario, for use by an open JSON parser in parsing a JSON resource.

DETAILED DESCRIPTION

Example methods and systems are directed to an open JSON parser that can be configured to parse different JSON resources without modifying source code. When a format of a JSON resource changes, applications currently must be modified to reflect the change. If an application using the JSON resource is not modified, the change adversely affects the functioning of the application. If the application is modified, software developer makes the modification and extensive regression testing may be required to ensure that no adverse effects result from the source code changes.

As discussed herein, when the format of a JSON resource (e.g., a JSON file) is changed, a corresponding rules file is modified to reflect the change. An application requests data from the JSON resource using an open JSON parser. The open JSON parser uses the rules file for the JSON resource to determine how to retrieve the requested data.

By modifying a rules file for an open JSON parser instead of modifying the source code of the application, efforts involved in maintaining applications that make use of JSON resources are reduced.

Figure 1:
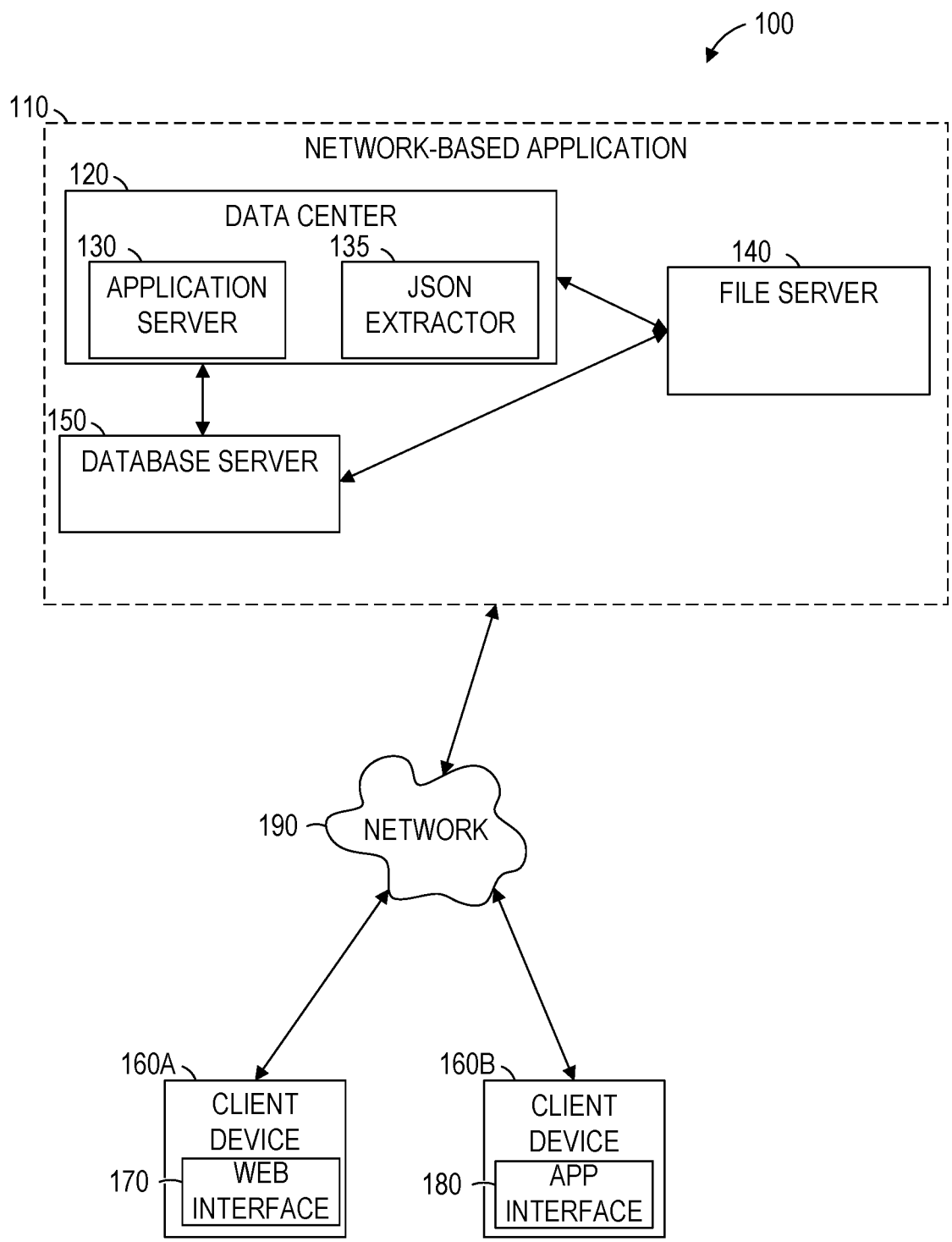
FIG. 1 shows a network diagram illustrating an example network environment suitable for an application that uses an open JSON parser to handle JSON resources.

FIG. 1 shows a network diagram illustrating an example network environment 100 suitable for an application that uses an open JSON parser to handle JSON resources. The network environment 100 includes the network-based application 110, client devices 160A and 160B, and a network 190. The network-based application 110 is implemented at a data center 120 comprising an application server 130 and a JSON extractor 135, in communication with a file server 140 and a database server 150. The file server 140, the database server 150, or both, may be part of the data center 120.

An application executing on the application server 130 accesses data from JSON resources using the JSON extractor 135. The JSON extractor 135 interprets rules for the accessed JSON resources and, based on the rules, retrieves the requested data. The JSON resources may be files stored on the file server 140, JSON objects stored in a relational or object-oriented database on the database server 150, or any suitable combination thereof.

Using the requested data, the application running on the application server 130 provides services to the client devices 160A and 160B. For example, a user of the client device 160A may be an employee of a business using a business application. The requested data may include information about invoices, accounts payable, and the like. Using the requested data, a business report may be generated by the application and presented on a display device of the client device 160A. The user interface for the application may be presented using a web interface 170 or an app interface 180.

The application server 130, the JSON extractor 135, the file server 140, the database server 150, and the client devices 160A and 160B may each be implemented in a computer system, in whole or in part, as described below with respect to FIG. 12. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 130, the JSON extractor 135, the file server 140, the database server 150, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one application server 130, two client devices 160A and 160B, and the like), any number of each element is contemplated. For example, the application server 130 may be one of dozens or hundreds of active and standby servers and provide services to millions of client devices. Likewise, the database server 150 may store data used by many application servers 130, and so on.

Figure 2:
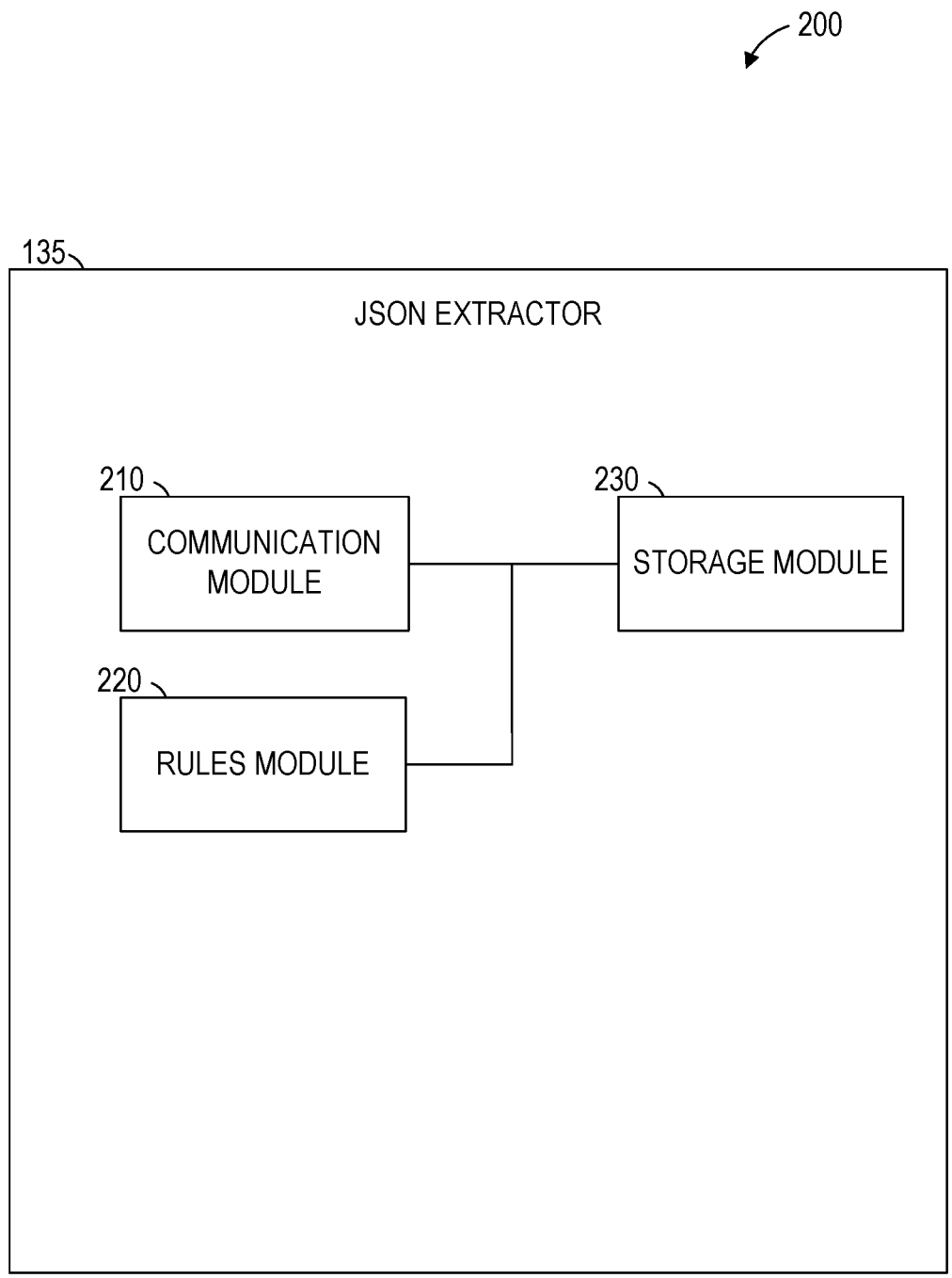
FIG. 2 shows a block diagram of a JSON extractor, suitable for providing services of an open JSON parser, according to some example embodiments.

FIG. 2 shows a block diagram 200 of the JSON extractor 135 of FIG. 1, suitable for providing services of an open JSON parser, according to some example embodiments. The JSON extractor 135 is shown as including a communication module 210, a rules module 220, and a storage module 230, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the JSON extractor 135 and transmits data from the JSON extractor 135. For example, the communication module 210 may receive, from the application server 130, an identifier (e.g., a file name) of a JSON resource to be accessed. In response, the rules module 220 identifies a corresponding set of rules. The rules may be stored in a file, in which case, the rules may be retrieved from the file (e.g., a file stored on the file server 140 of FIG. 1) using the communication module 210.

The rules module 220 applies the rules to interpret the JSON resource and generate data that is responsive to the request received from the application server 130. The communication module 210 sends the responsive data to the application server 130, in response to the request. Thus, when the format of a JSON resource changes, the application running on the application server 130 is not modified. Changing the rules for the JSON resource is sufficient to allow the JSON extractor 135 to adapt to the changed format.

JSON resources, rules, or any suitable combination thereof may be stored and accessed by the storage module 230. For example, local storage of the JSON extractor 135, such as a hard drive, may be used. As another example, network storage may be accessed by the storage module 230 via the network 190.

FIG. 3 shows an illustration of a file 310 containing JSON data and a file 320 containing rules for use by an open JSON parser in parsing the JSON data file, according to some example environments. The file 310, titled "data.json" stores a data structure including a storyId, a title, a description, content, and a flag indicating whether the data structure has optimization enabled. The content is a component structure that includes a version and an array of entities. The file 320, titled "data1.rules" defines a set of rules for accessing the data structure in the file 310.

Applying the rules in the file 320 to the data structure in the file 310 generates another JSON resource. The "$" symbol indicates that values will be taken from the current location in the input JSON resource, initially the top level of the resource. The file 310 may be referred to as a "configuration file," since it configures the JSON extractor 135 of FIG. 1 to extract data from an input JSON resource. The configuration file comprises a keyword, "node," that specifies a beginning of a query. The node keyword is followed by a pair of curly braces that enclose the description of the node. For convenience, the node is described as "containing" its description. The node includes one or more named sections. Each of the named sections identifies a name to be used in the output JSON resource along with the data from the input JSON resource to be used to populate the output JSON resource.

The text

```
"node": {
    "story": {
``` indicates that the first element in the output JSON resource will be called "story." In this example, the node contains only one section, the "story" section. Additional nodes may be added as comma-separated elements in the file 310. The text within the curly braces after "story" defines the values that will be contained in the first element.

The text

```
"query": "$.data", "specification": {
``` indicates that the text within the following curly braces will use values from the structure in the file 310 labeled "data." The specification portion of the rules specifies how data from the data structure will be used to populate the output JSON resource.

The named section (e.g., the "story" section of the file 310) comprises a list of attributes to be extracted from the JSON resource. In this example, the "attributes" keyword identifies an array of two attributes. The first element of the array is named "id" and has the value "$.storyId." Since the attributes section is a sub-section of the story section and the story section defined the query as "$.data", $.storyId here refers to data.storyId in the input JSON resource. The second element of the array is named "version" and has the value "$.content.version." As with the first element, this refers to data.content.version in the input JSON resource. Thus, the output from applying the rules of the file 320 to the data structure in the file 310 will be:

```
{
    "data" : [
        {
            "name" : "story",
            "objects" : [
                {
                    "values" : {
                        "id": "STORY:t.1:43CD9B0D4311426E",
```

-continued

```
            "version": "2.70"
          }
        }
      ]
    }
  }
}
```

FIG. 4 shows an illustration of a file 410 containing rules that include a subquery, for use by an open JSON parser in parsing a JSON resource. The file 410, titled "data2.rules," defines a set of rules for accessing a JSON resource. Unlike the file 320 of FIG. 3, the file 410 includes a subquery.

Applying the rules in the file 410 to an input JSON resource will generate another JSON resource. The "$" symbol indicates that values will be taken from the input JSON resource. The text

```
"node": {
  "page": {
``` indicates that the first node in the output JSON resource will be called "page." The text within the curly braces after "page" defines the values that will be contained in the first node.

The text

```
"query": "$.data.pages[*]", "specification": {
``` indicates that the input JSON resource includes a structure called "data" that includes an array labeled "pages." Here, the asterisk (or "star") is a wildcard that indicates that the specification will operate on all elements of the array.

Each "page" will include a "values" array comprising a set of objects having names and values. The portion of the file 410

```
"attributes": [
  {
    "name": "id",
    "query": "$.id"
  },
],
``` will create an element of the values array named "id" and having the value $.data.pages[x].id, where x identifies the particular page being operated on.

Additionally, the file 410 provides a second "node" within the specification section of the first node. This repetition of the keyword used to specify the beginning of a query is used here to specify a beginning of a subquery. This will cause a subquery to be executed that processes additional data within the same context (in this case, for the same page). The subquery identifies attributes to be extracted from the JSON objects corresponding to the instances in the list of instances generated by the main query.

The sub-node will be called "widget" and gather data from $.widgets[*], an array of data within each input page element. The attributes section of this sub-node appears the same as the attributes section of the page, but "$.id" within the subquery refers to data.pages [x].widgets [y].id in the input JSON resource, where x identifies the current page and y identifies the current widget. Each query statement is read in the context of its parent, so "$" in "$.data.pages[*]" refers to the JSON resource being accessed; "$" in "$.widgets[*]" refers to "data.pages[x]" in the JSON resource, where x identifies a particular page being accessed; and "$" in "$.id" refers to "data.pages[x].widgets[y]" in the JSON resource, where x and y identify a particular widget of a particular page.

The "scope" keyword may be used in a subquery to change the meaning of "$" in the subquery. Without the "scope" keyword, as discussed above, the "$" in the sub-query refers to the instance resulting from the main query. By including "scope": "root" in the sub-query, the "$" instead refers to the input JSON resource. For example:

```
"query": {
  "value": "$.data.content.entities[?(@.id == {0})]", "scope": "root",
}
```

Considering the above as a sub-query, the "$" in "$.data.content.entities[?(@.id=={0})]" refers to the root of the JSON resource, not the instance returned by the main query because of the "scope": "root" being present.

Fallback queries may be included in the rules by including a list of queries instead of only a single query. If the first query results in a "Path Not Found" exception, the second query is executed, and so on. For example:

```
"query": [
  "$.data. content.entities[*].data.pages[*]",
  "$.data.oldcontent.entities[*].data.pages[*]"
]
```

In this example, the query first attempts to read data using a path that is currently used for creating content. If the query fails, the query attempts to read data using an older path. This feature may enable a single rules file to support multiple input JSON resource formats.

When a path or an instance requested by a query is not found, the open JSON parser may generate a log entry to show the exception. In some example embodiments, whether the log entries are generated is configurable in the rules file. For example, a "logExceptions": true or
"logExceptions": false
statement may be included to cause invalid path exceptions to be logged or not logged, respectively. As another example, a "logNoResult": true or
"logNoResult": false
statement may be included to cause or disable logging when a path is valid but the value doesn't exist.

FIG. 5 shows an illustration of a rules file 510 containing rules that include an exemption, for use by an open JSON parser in parsing a JSON resource. The file 510, titled "data3.rules," defines a set of rules for accessing a JSON resource.

A portion of the file 510 is similar to a portion of the file 410 and defines a node with information about all widgets for all pages in the input JSON resource. Additionally, the file 510 includes an "exemptions" section. The "specification" section says that, for each widget, a name/value pair should be created with name "id" and value "$.id." The "exemptions" section says that if the "condition" is met of the widget being of the class "DynamicTableWidget," two name/value pairs should be created instead.

The first name/value pair is called "type." The value is determined by applying a regular expression (or "regex") to the results of the query, "$.class." The regex of the file 510 extracts the name of the class of the widget, minus the terminating string "Widget." In this case, since the regex is only executed when the class is "DynamicTableWidget," the value of the "type" of the exempted widgets will be "DynamicTable."

The second name/value pair repeats the "id" and "$.id" values applied to widgets that don't meet the condition. Thus, all widgets found in the input JSON resource will generate data elements in the output JSON resource that include their id. The DynamicTableWidgets will further include a "type" that indicates the type of widget. Accordingly, the application that requested data from the input JSON resource will be able to distinguish between DynamicTableWidgets and other widgets.

The exemptions keyword allows the user to define a set of conditions for which the parsing with have different behaviors. In this case, if the class is a dynamicTable, the specification that will be applied will be the one corresponding to the condition and not the one of the "widget." The label keyword is optional. When set, each instance for which this exemption is applied has the condition field set to this label value. If the label field is omitted, the condition field is set to "exemption[x]," where x is the position of the exemption in the exemption list.

In the example of FIG. 5, the data accessed for each instance is the id, for output, and the class, to determine whether to apply the exemption. In other example embodiments, the data accessed for different instances may differ, depending on the results of the conditions. For example, the attributes section in the "exemptions" could access a version number instead of an id. Accordingly, in some example embodiments, a first set of attributes is accessed from the JSON resource when a first condition is met (e.g., the condition in the exemption is true), and a second set of attributes is accessed from the JSON resource when the first condition is not met (e.g., the condition in the exemption is false).

FIG. 6 shows an illustration of a file 610 containing rules that include a scenario, for use by an open JSON parser in parsing a JSON resource. The file 610 includes a single node. The query will extract a list of instances including all widgets for all pages of the first entity in the JSON resource. For each widget, the id will be accessed.

A new element included in the file 610 that is not present in the files 320, 410, and 510 (of FIGS. 3-5) is the "scenarios" keyword. The "scenarios" keyword defines one or more scenarios. The "scenarios" element is an array, with each element in the array defining a scenario. Each scenario includes a statement. The statement is a shorthand if or if-then statement. The portion of the statement before the question mark is a test that returns a Boolean result, either true or false. The portion after the question mark is an action that is executed if the result is of the test is true. If the action is executed, the result of the action is used as the value. The "@" symbol represents the results of the current query.

Thus, in the example of FIG. 6, if the id of the current widget is null, the value for the widget is a string that includes a hash result. The input to the hash is a concatenation of the source and the path. The source is an identifier of the JSON resource being parsed, such as the name of the file 310 of FIG. 3, "DATA.JSON." The path is a Jayway path to the current query. In the example of FIG. 6, the path is "data.content.entities[0].data.pages[x].content.widgets[y].id," where x and y are substituted with the indices for the current widget.

If the id of the current widget is not null, the next scenario is evaluated. The statement of the second scenario causes the value to be set to the length of the id if the length of the id is greater than 16. If the tests of all scenarios are false, the result of the query (in this case, the id of the widget) is used as the value, as for the file 510 of FIG. 5. The "then" portion of an if-then statement can be included by adding a colon after the action to be taken if the test is true, followed by an action to be taken if the test is false. If the test is false, the action after the colon is executed instead. In this case, the result of the query would never be used, since the test will either be true or false and an action will always be executed.

If the scenarios array includes multiple elements, the test of the first statement is false, and the first statement does not include an action to be taken if the test is false, the second scenario will be evaluated. This process will continue until all scenarios have been evaluated or a scenario has modified the value of the current attribute.

In each of the scenarios in FIG. 6, the query comprises a modification of accessed data to be performed before responding to the request. The first scenario changes a null value to an output of a hash function. The second scenario replaces long ids with an indication of the length of the id rather than the id itself. Also, each scenario in the query comprises a condition under which the modification is to be performed. The modification of the first scenario is performed only if "(@=null)" is true; the modification of the second scenario is performed only if "len(@)>16" is true.

As another example, the value to be used may be specified in the rules themselves rather than calculated by a function based on the data read. For example, replacing the statement in the first scenario with the statement:

"statement": "(@=null)?1111:2222"
results in a value of 1111 being provided if
"data.content.entities[0].data.pages[x].content.
widgets[y].id" is null and 2222 being provided otherwise. In this case, since the statement of the first scenario always results in a value being set, the second scenario is never applied.

In the example of FIG. 6, two functions are used: hash( ) and len( ). Additional functions may be available, as shown in the table below.

| function | description and usage |
| --- | --- |
| count(@) | Count the number of members of a collection/array. e.g., "statement": "(@=null)?0:\"=(count(@))\"" |
| first(@) | Returns the first element of a collection of objects (even if it is null) e.g., "statement": "(@!=null)?\"(first(@))\"" |
| firstNotNull(@) | Returns the first non-null element of a collection of objects. e.g., "statement": "(@!=null)?\"(firstNonNull(@)))\"" |

| function | description and usage |
|---|---|
| hash(@),<br>hash(source),<br>hash(path),<br>hash(source + path) | hash the content returned by the query to produce a short alpha-numerical string (32 characters). e.g., "statement": "(@!=null)?\"=(hash(@))\"" |
| isStr(@) | Evaluate if the field returned by the query is a string or not. e.g., "statement": "\"=(isStr(@))\"=true)?\"string\":\"not string\"" |
| isInt(@) | Evaluate if the field returned by the query is an integer or not. e.g., "statement": "\"=(isSInt(@))\"=true)?\"int\":\"not int\"" |
| left(@, X) | Extract the first X characters of the field value (which must be a string). X must be greater than 0 and if the len of the value is smaller than X, the function will return the full value. e.g., "statement": "(@!=null)?\"=(left(@,10))\"" |
| len(@) | Evaluate the length of a string. The parameter must be a string or else the function will throw an exception. e.g., "statement": "(\"=len(@))\">64)?\"long string" |
| parse(@) | Unstringify the (string) value returned by a query. The result will be dictionary (or json). e.g., "statement": "(@!=null)?\"=(parse(@))\"" |
| query(<query path>, @) | Apply a more specific query for the attribute. e.g., "statement": "(@!=null)?\"=(query($.datasetId, @))\"" |
| toStr(@) | Transform the field value into a string if this is not already a string. e.g., "statement": "(@!=null)?\"=(toStr(@))\"" |
| type(@) | Returns the java type of the value returned by the query. It could be STRING, NUMBER (for integer or double), BOOLEAN, ARRAY (for collections), or OBJECT (for json or dictionary). e.g., "statement": "(@!=null)?\"=(type(@))\"" |

Complex statements are possible by including an array as the positive or negative action of a statement. In each step, "@" represents the current return value. For example:
  "statement":            "(@!=null)?["=(firstNonNull(@)))", "=(hash(@))" ]"
In this example, if the result of the query (referenced as "@") is not null, both actions in the array are executed in sequence. The first action sets @ to the first non-null element of the result of the query. The second action sets @ to the hash of the first non-null element.

It is also possible to add attributes when the evaluation of a statement expression triggers an action. In the example below, the "misc" attribute is added if the "id" is null.

```
"statement": "(@=null)?{0}",
"actions": [
  {
    "attributes": [
      {
        "name": "misc",
        "query": "$.data.content.segments[1].dataRegion.misc"
      }
    ]
  }
]
```

Multiple types of actions (e.g., setting a new value, executing a function, and adding an attribute) may be combined. For example:

```
"statement": "(@=null)?{0},\"=(hash(source))\"]",
"actions": [
  {
    "attributes": [
      {
```

-continued

```
        "name": "misc",
        "query": "$.data.content.segments[1].dataRegion.misc"
      }
    ]
  }
]
```

In this example, if the id is null, the value is set to 0 and the misc attribute is added. If the id is not null, the hash( ) function is executed.

Figure 7:
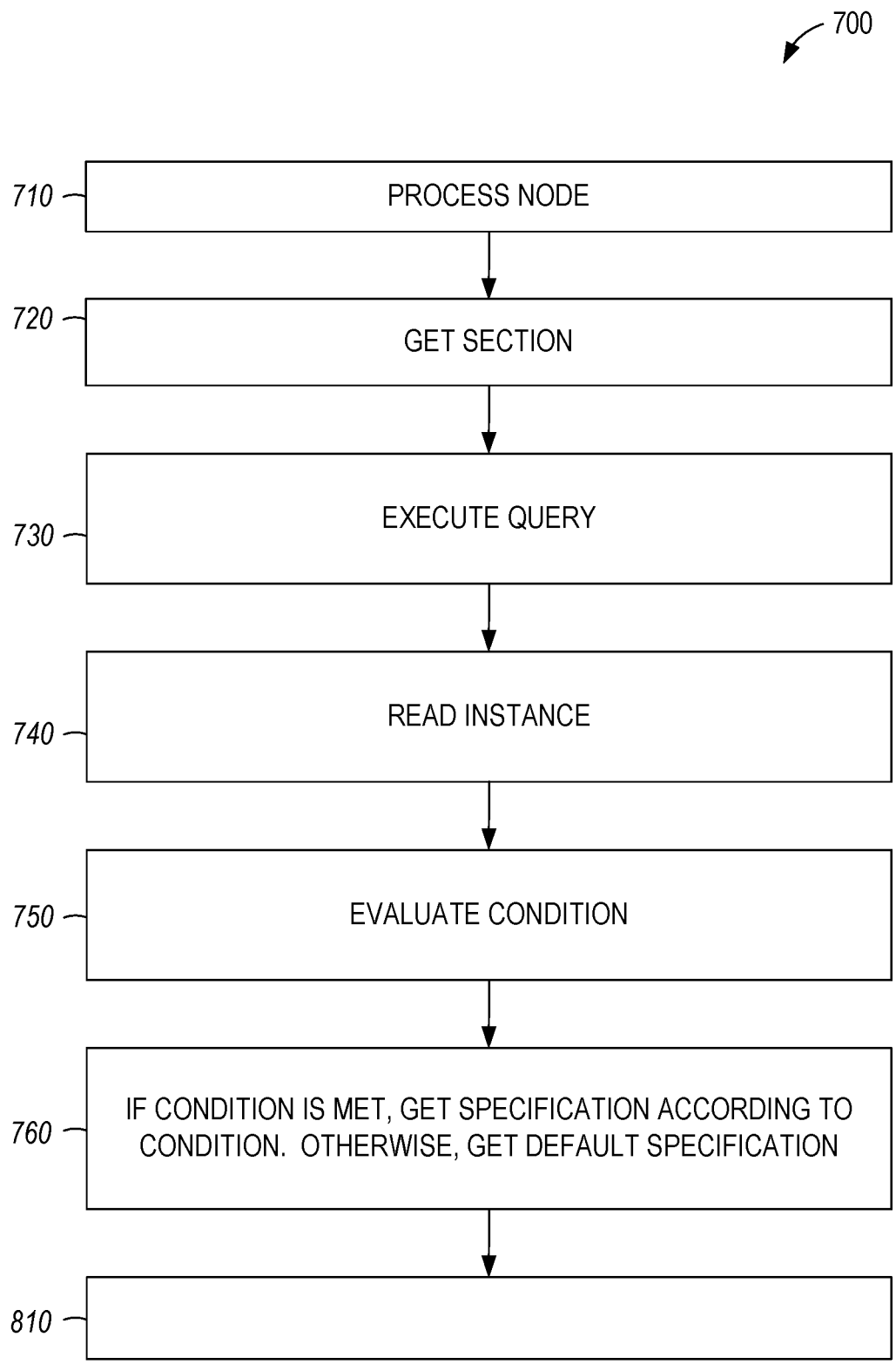
FIGS. 7-9 show a flowchart illustrating operations of an example method suitable for parsing JSON resources by an open JSON parser.
Figure 8:
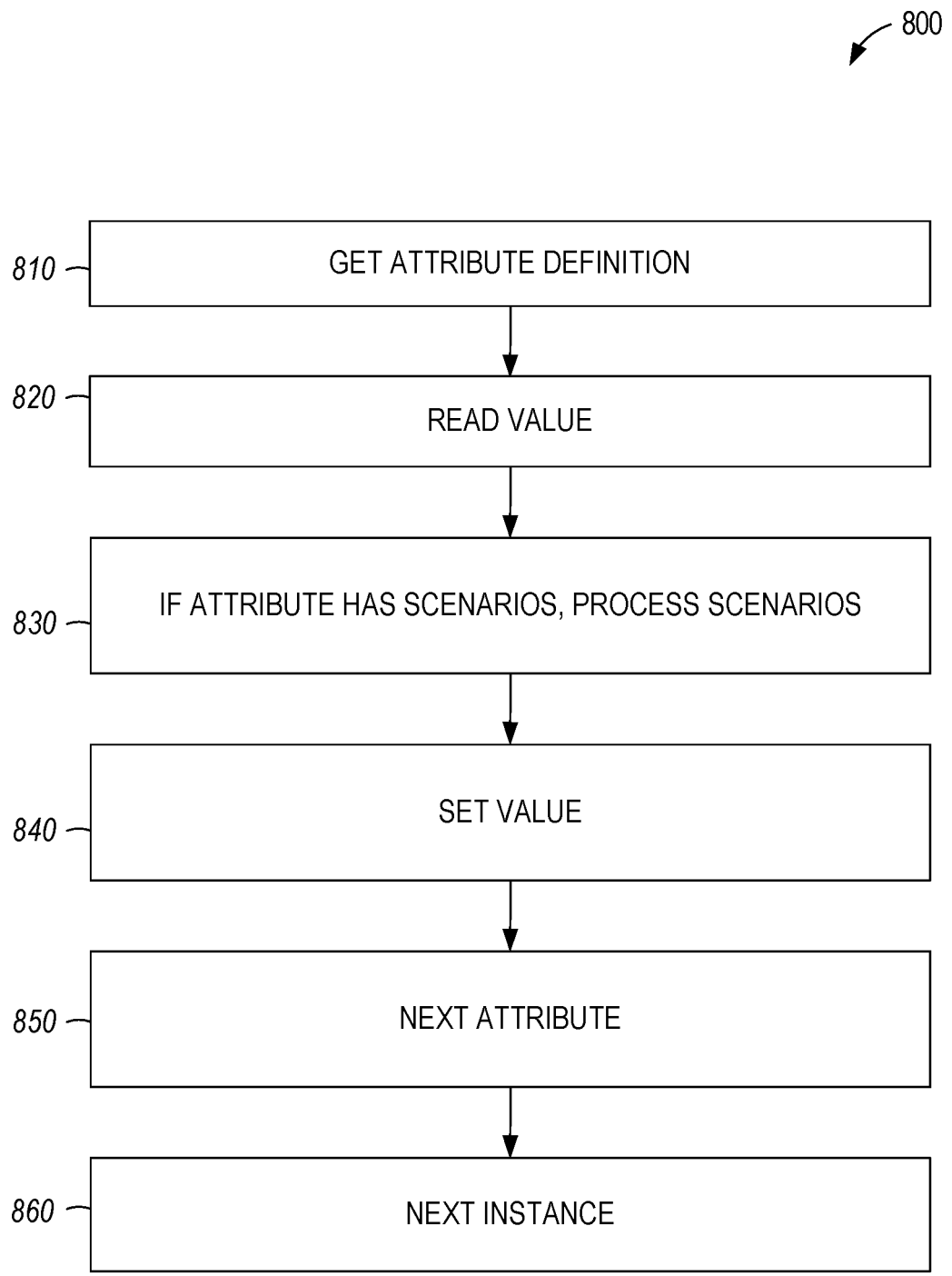
Figure 9:
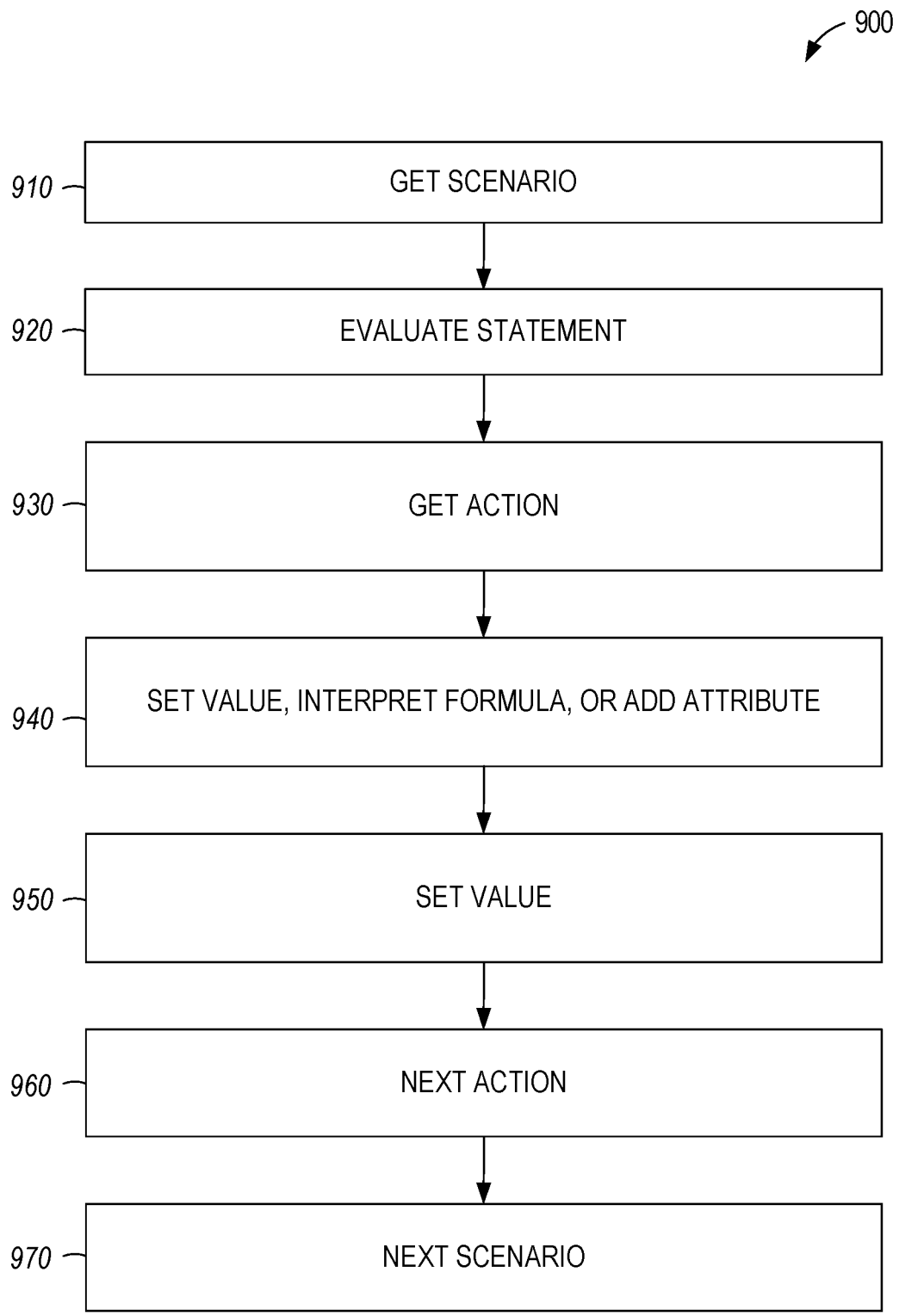

FIGS. 7-9 show a flowchart illustrating operations of an example method suitable for parsing JSON resources by an open JSON parser. FIG. 7 includes portion 700 of the flowchart of FIGS. 7-9. The portion 700 includes operations 710, 720, 730, 740, 750, and 760. Additionally, a placeholder for operation 810 is included, to show the relationship between the portion 700 of FIG. 7 and the following portion of the flowchart shown in FIG. 8.

In operation 710, the JSON extractor 135 of FIG. 1 begins processing a node in a rules object. For example, the rules object in the file 320 of FIG. 3 (or an identifier of the file 320) may be provided to the JSON extractor 135 along with the JSON resource in the file 310 of FIG. 3 (or an identifier of the file 310) to be parsed according to the rules. The file 320 contains a single "node," but other rules objects contain multiple nodes. The curly braces in the file 320 are paired, so that everything in the pair of curly braces beginning after "node" defines the structure of the first node.

Each node contains one or more sections. In operation 720, the JSON extractor 135 begins processing the first section of the current node. In the file 320, the first section is the only section, and it is labeled "story." The query specified by the "query" keyword is executed in operation 730. The query may be defined as a Jayway path. When executed, the query returns a list of instances, each of which corresponds to a JSON object. In the file 320, the query is "$.data." There is a single "data" element of the file 310, so the list of instances includes only a single JSON object that contains the "data" element.

In operation 740, the JSON extractor 135 reads a current instance from the list of instances. Any condition defined in the node is evaluated in operation 750. In the example of the file 310, no condition is present. However, the file 510 provides an example of a rules object that includes a condition.

The JSON extractor 135, in operation 760, gets the specification for the current instance. If a condition is met, the specification is the specification for the met condition. Otherwise, the specification for the current instance is the default specification for the node.

FIG. 8 includes portion 800 of the flowchart of FIGS. 7-9. The portion 800 includes operations 810, 820, 830, 840, 850, and 860. In operation 810, the JSON extractor 135 gets an attribute definition. For example, the specification in the file 320 of FIG. 3 includes an array of two attributes. The first attribute has name "id" and value "$.storyId."

The JSON extractor 135 reads the value from the JSON resource being parsed in operation 820. In this example, the value is "STORY:t.1:43CD9B0D4311426E," taken from the data.storyId value in the JSON resource of the file 310 of FIG. 3.

If the attribute has scenarios, the scenarios are processed in operation 830. The file 320 does not include scenarios. As discussed with regard to the file 610 of FIG. 6, scenarios may be used to change the value. The portion 900 of the flowchart of FIGS. 7-9, shown in FIG. 9, provides more detail regarding the processing of scenarios.

In operation 840, the JSON extractor 135 sets the value for the attribute. In the example of the file 320, the value is just the value that was read using the query. In the example of the file 610, the value is the value that was read using the query unless that value is null. In that case, the scenario would have been processed in operation 830 and the value would be set to a result of a hash.

After operation 840, the processing of the first instance is complete. The process continues in operation 850 by advancing to the next attribute in the specification selected in operation 760 and returning to operation 810. Thus, operations 810-840 are repeated for each attribute. Once all attributes have been processed, operation 860 is performed, advancing to the next instance in the list of instances found in operation 730 and returning to operation 740. Operations 740-760 are performed for each instance, and operation 810-840 are performed for each attribute of each instance.

Once all attributes of all instances have been processed, the operations of the JSON extractor 135 in parsing the JSON resource are complete. If the method of FIGS. 7-9 was initiated by an application requesting data from an input JSON resource, the output of the JSON extractor 135 is provided to the application in response to the request. As a result, if the format of the input JSON resource changes, corresponding changes in the rules file can enable the application to continue to execute properly, without modifying the source code of the application.

FIG. 9 includes portion 900 of the flowchart of FIGS. 7-9. The portion 900 includes operations 910, 920, 930, 940, 950, 960, and 970. The portion 900 expands on operation 830 of FIG. 8. If no scenarios are found in operation 830, operation 840 follows. If scenarios are found in operation 830, operations 910-970 are performed before operation 840.

The portion 900 sequentially processes the scenarios. In operation 910, the JSON extractor 135 gets a scenario. Operations 920-960 are performed for the scenario and, if more scenarios remain to be processed, operation 970 causes the next scenario to be processed. Operations 910-960 are performed for the next scenario and the process repeats until all scenarios have been processed.

Considering the file 610 of FIG. 6, the first scenario includes a test to see if the id of a widget is null. In operation 920, the statement of the current scenario is evaluated. If the test portion of the statement is true, the action for a true result is retrieved in operation 930. If the test portion of the statement is false, the action for a false result, if any, is retrieved in operation 930. If an action is retrieved, the process continues with the operation 940. Otherwise, operations 940-960 are skipped and processing continues with the next scenario.

In operation 940, the action retrieved in operation 930 is executed to set a value, interpret a formula, or add an attribute. Processing the scenarios in the file 610 involves both setting the value and interpreting formulas. The first scenario includes the formula "hash(source+path)" and the second scenario includes the formula "len(@)." The first formula generates a numeric result generated by hashing the source and path of the current instance. The second formula generates a numeric result generated by counting the number of characters in the id of the current instance. The "=" in the two statements causes the value to be set to the result of each formula. Other scenarios may include attribute statements that cause additional attributes to be added when the test for the scenario is met.

The value for the attribute is set in operation 950 according to the result of operation 940. Statements may include multiple actions, which are processed sequentially. If the statement includes more actions, operation 960 causes the process to return to operation 930, which gets the next action. Once all actions have been processed, the process continues with operation 970. If additional scenarios remain to be processed, operation 910 is repeated with the next scenario. Once all scenarios have been processed, the portion 900 is complete and the process continues with operation 840 of FIG. 8.

Figure 10:
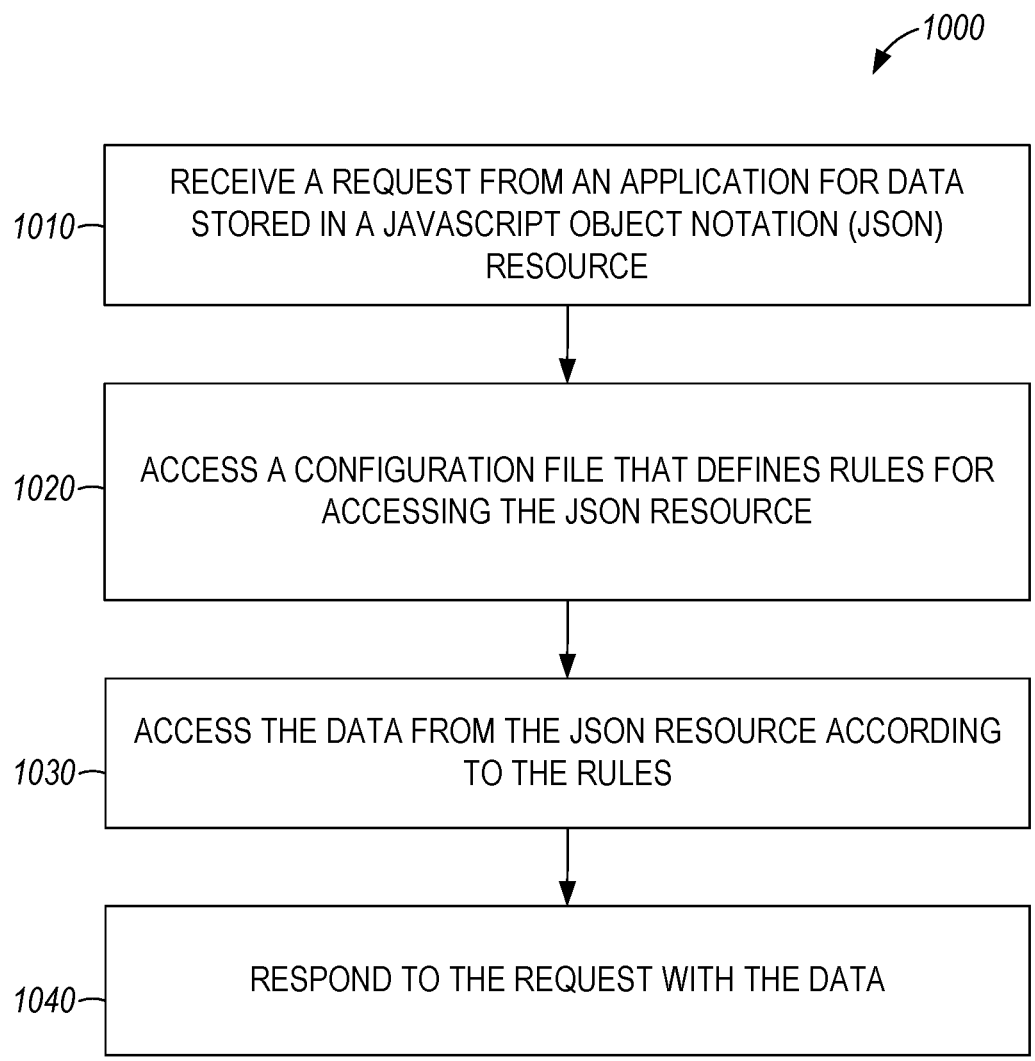
FIG. 10 shows a flowchart illustrating operations of an example method suitable for use by an open JSON parser in handling a request for data.

FIG. 10 shows a flowchart illustrating operations of an example method 1000 suitable for use by an open JSON parser in handling a request for data. The method 1000 includes operations 1010, 1020, 1030, and 1040.

In operation 1010, the JSON extractor 135 of FIG. 1 receives a request from an application (e.g., an application running on the application server 130 of FIG. 1) for data stored in a JSON resource (e.g., the JSON resource of the file 310 of FIG. 3). The JSON extractor 135, in operation 1020, accesses a configuration file (e.g., the file 320 of FIG. 3) that defines rules for accessing the JSON resource. The data is accessed from the JSON resource according to the rules (operation 1030). Example output from accessing the JSON resource of the file 310 according to the file 320 is shown above, in the discussion of FIG. 3. In operation 1040, the JSON extractor 135 responds to the request with the data. Thus, the data received by the application from the JSON extractor 135 is in a format defined by the rules. If changes are made to the structure of the file 310, corresponding modifications may be made to the file 320 to avoid necessitating modifications to the source code of the application.

The open JSON parser may be implemented using Java and accessed by the application running on the application server 130 using code similar to:

public void dumpParserChart( ) throws Exception {

```
JsonNode jsonStory = ...
JsonNode jsonSettings = ...
Parser parser = new Parser( jsonStory, new Settings(jsonSettings));
JsonNode results = parser.run ;
if (results != null)
   ... print results
}
```

In the sample code above, jsonStory identifies the input JSON resource to be parsed and jsonSettings identifies the file containing the rules to be applied. The Settings object extracts the rules from the file. The Parser object is the open JSON parser. When the instance of Parser, named parser, is created, the creation parameters identify the input JSON resource and the settings to be applied. The results of parsing the input JSON resource according to the rules are provided as the output of parser.run( ).

The rules file can be large and complex. To aid in debugging the rules, the open JSON parser may include helpful functions. For example, a check( ) function may return a list of errors found while parsing the rules file. As another example, a dump( ) function may provide the settings found while parsing the rules file. These functions may be used as shown in the example below:

```
public void checkSettings( ) throws Exception {
   JsonNode jsonNode = ...
   Settings settings = new Settings(jsonNode);
   if (!settings.is Valid( )) {
      ArrayNode results = settings.check(Settings.CHECK_INVALID);
      ... print results
      System.out.println(results.size( ) + " errors found.");
   }
}
public void dumpSettings( ) throws Exception {
   JsonNode jsonNode = ...
   Settings settings = new Settings(jsonNode);
   JsonNode results = settings.dump( );
   ... print results
}
```

Metadata may be added to the parser to specify a context for a current action. The metadata may be stored in logs generated by the open JSON parser to facilitate later analysis of the logs. Additionally, or alternatively, the metadata may be included in the output JSON resource. The metadata may define variables that can be referenced in the rules. For example, if multiple accounts access the same source data, an accountId can be defined in the metadata provided by the application. The rules can provide for the accountId to be included as a data entry in the resulting JSON resource. An example is shown below:

```
public void Parse( ) throws Exception {
   JsonNode jsonStory = ...
   JsonNode jsonSettings = ...
   JsonNode metadata = {
      "metadata": {
         "accountId": "12345"
      }
   };
```

-continued

```
   Parser parser = new Parser(jsonStory, new Settings(jsonSettings), new
Metadata(metadata));
   JsonNode results = parser.run( );
   ...
}
```

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: receiving a request from an application for data stored in a JavaScript Object Notation (JSON) resource; accessing a configuration file that defines rules for accessing the JSON resource; accessing the data from the JSON resource according to the rules; and responding to the request with the data.

In Example 2, the subject matter of Example 1, wherein the configuration file comprises a keyword that specifies a beginning of a query.

In Example 3, the subject matter of Example 2, wherein the query comprises a named section.

In Example 4, the subject matter of Example 3, wherein the named section comprises a list of attributes to be extracted from the JSON resource.

In Example 5, the subject matter of Examples 3-4, wherein the named section comprises a Jayway path that, when executed, returns a list of instances, each instance of the list of instances corresponding to a JSON object.

In Example 6, the subject matter of Example 5, wherein the query comprises a repetition of the keyword to specify a beginning of a subquery.

In Example 7, the subject matter of Example 6, wherein the subquery identifies attributes to be extracted from the JSON objects corresponding to the instances in the list of instances.

In Example 8, the subject matter of Examples 2-7, wherein the query comprises: a first set of attributes to be accessed from the JSON resource when a first condition is met; and a second set of attributes to be accessed from the JSON resource when the first condition is not met.

In Example 9, the subject matter of Examples 2-8, wherein the query comprises a modification of accessed data to be performed before responding to the request.

In Example 10, the subject matter of Example 9, wherein the query comprises a condition under which the modification is to be performed.

Example 11 is a non-transitory computer-readable medium that stores instructions that, when executed by one or more processors, cause the one or more processors to perform operations comprising: receiving a request from an application for data stored in a JavaScript Object Notation (JSON) resource; accessing a configuration file that defines rules for accessing the JSON resource; accessing the data from the JSON resource according to the rules; and responding to the request with the data.

In Example 12, the subject matter of Example 11, wherein the configuration file comprises a keyword that specifies a beginning of a query.

In Example 13, the subject matter of Example 12, wherein the query comprises a named section.

In Example 14, the subject matter of Example 13, wherein the named section comprises a list of attributes to be extracted from the JSON resource.

In Example 15, the subject matter of Examples 13-14, wherein the named section comprises a Jayway path that, when executed, returns a list of instances, each instance of the list of instances corresponding to a JSON object.

In Example 16, the subject matter of Example 15, wherein the query comprises a repetition of the keyword to specify a beginning of a subquery.

In Example 17, the subject matter of Example 16, wherein the subquery identifies attributes to be extracted from the JSON objects corresponding to the instances in the list of instances.

Example 18 is a method comprising: receiving, by one or more processors, a request from an application for data stored in a JavaScript Object Notation (JSON) resource; accessing, by the one or more processors, a configuration file that defines rules for accessing the JSON resource; accessing, by the one or more processors, the data from the JSON resource according to the rules; and responding to the request with the data.

In Example 19, the subject matter of Example 18, wherein the configuration file comprises a keyword that specifies a beginning of a query.

In Example 20, the subject matter of Example 19, wherein the query comprises a named section.

Example 21 is an apparatus comprising means to implement any of Examples 1-20.

Figure 11:
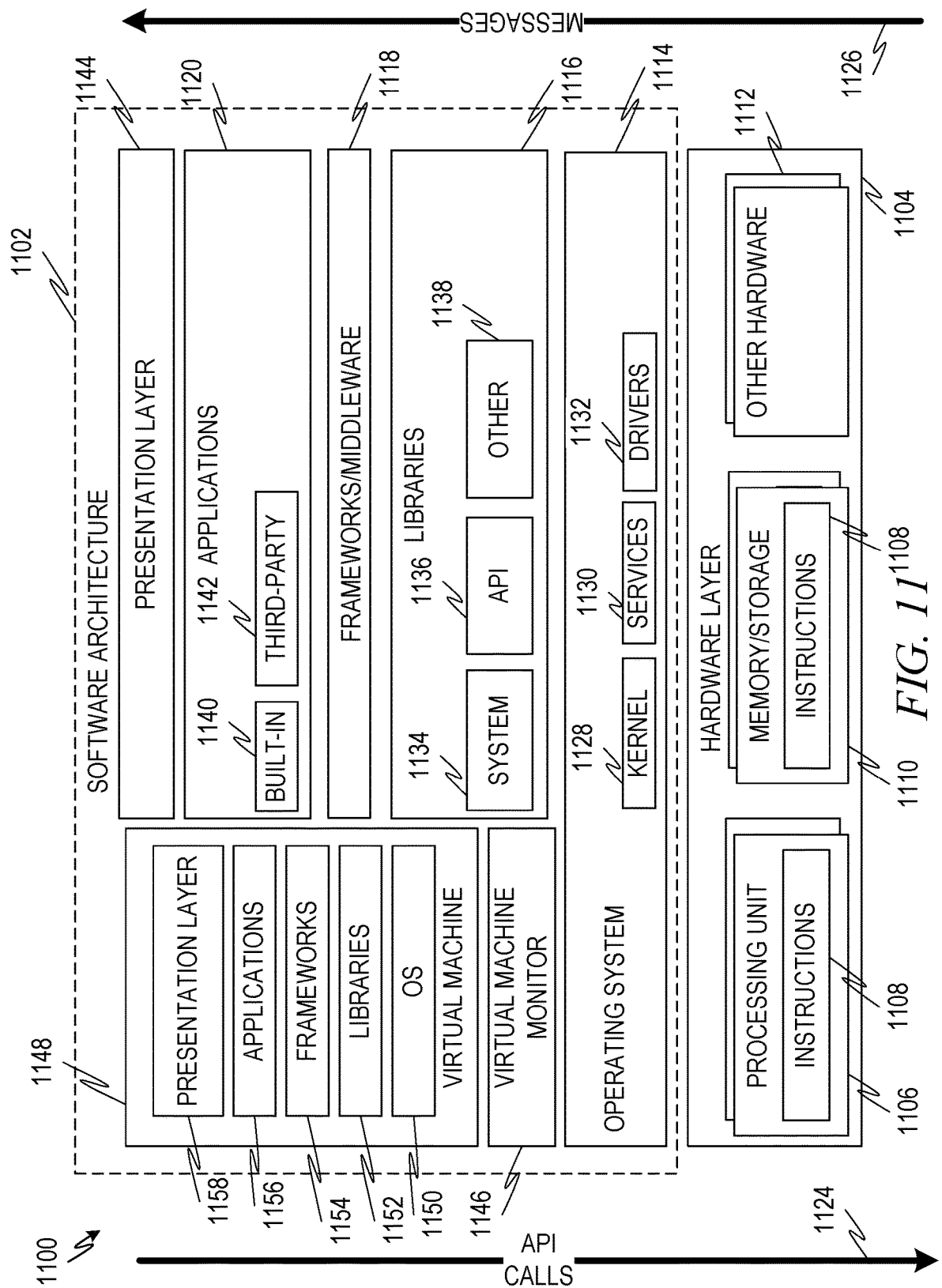
FIG. 11 shows a block diagram showing one example of a software architecture for a computing device.

FIG. 11 shows a block diagram 1100 showing one example of a software architecture 1102 for a computing device. The software architecture 1102 may be used in conjunction with various hardware architectures, for example, as described herein. FIG. 11 is merely a non-limiting example of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 12:
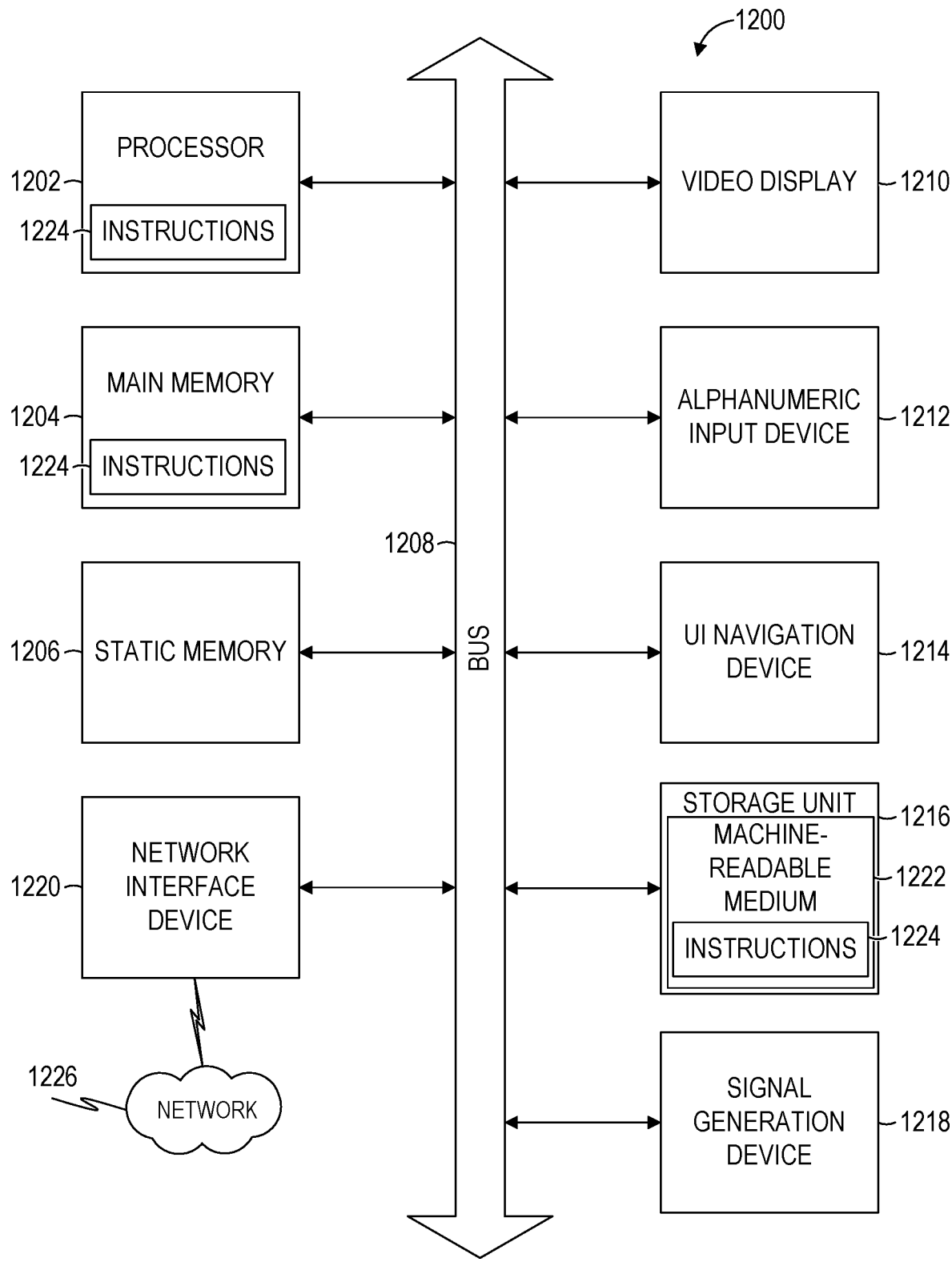
FIG. 12 shows a block diagram of a machine in the example form of a computer system within which instructions may be executed for causing the machine to perform any one or more of the methodologies discussed herein.

FIG. 12 shows a block diagram of a machine in the example form of a computer system 1200 within which instructions 1224 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting a machine-readable medium 1222.

While the machine-readable medium 1222 is shown in FIG. 12 to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM)disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
    a memory that stores instructions; and
    one or more processors coupled to the memory and configured to execute the instructions to perform operations comprising:
        receiving a first request from an application for first data stored in a first JavaScript Object Notation (JSON) resource;
        accessing a first configuration file that defines first rules for accessing the first JSON resource, the first configuration file comprising a keyword that specifies a beginning of a query that comprises a named section, the named section comprising a Jayway path that, when executed, returns a list of instances, each instance of the list of instances corresponding to a JSON object, the query comprising a repetition of the keyword to specify a beginning of a subquery;
        accessing the first data from the first JSON resource according to the first rules;
        responding to the first request with the first data;
        receiving a second request from the application for second data stored in a second JSON resource, the second JSON resource being a modified version of the first JSON resource;
        accessing a second configuration file that defines second rules for accessing the second JSON resource; and
        responding to the second request with the second data.

2. The system of claim 1, wherein the named section comprises a list of attributes to be extracted from the JSON resource.

3. The system of claim 1, wherein the subquery identifies attributes to be extracted from the JSON objects corresponding to the instances in the list of instances.

4. The system of claim 1, wherein the query comprises:
    a first set of attributes to be accessed from the first JSON resource when a first condition is met; and
    a second set of attributes to be accessed from the first JSON resource when the first condition is not met.

5. The system of claim 1, wherein the query comprises a modification of accessed data to be performed before responding to the first request.

6. The system of claim 5, wherein the query comprises a condition under which the modification is to be performed.

7. The system of claim 1, wherein source code of the application is not modified between the first request and the second request.

8. The system of claim 1, wherein the second configuration file is a modified version of the first configuration file.

9. A non-transitory computer-readable medium that stores instructions that, when executed by one or more processors, cause the one or more processors to perform operations comprising:
    receiving a first request from an application for first data stored in a first JavaScript Object Notation (JSON) resource;
    accessing a first configuration file that defines first rules for accessing the first JSON resource, the first configuration file comprising a keyword that specifies a beginning of a query that comprises a named section, the named section comprising a Jayway path that, when executed, returns a list of instances, each instance of the list of instances corresponding to a JSON object, the query comprising a repetition of the keyword to specify a beginning of a subquery;
    accessing the first data from the first JSON resource according to the first rules;
    responding to the first request with the first data;
    receiving a second request from the application for second data stored in a second JSON resource, the second JSON resource being a modified version of the first JSON resource;
    accessing a second configuration file that defines second rules for accessing the second JSON resource; and
    responding to the second request with the second data.

10. The non-transitory computer-readable medium of claim 9, wherein the named section comprises a list of attributes to be extracted from the JSON resource.

11. The non-transitory computer-readable medium of claim 9, wherein the subquery identifies attributes to be extracted from the JSON objects corresponding to the instances in the list of instances.

12. The non-transitory computer-readable medium of claim 9, wherein the query comprises:
a first set of attributes to be accessed from the first JSON resource when a first condition is met; and
a second set of attributes to be accessed from the first JSON resource when the first condition is not met.

13. The non-transitory computer-readable medium of claim 9, wherein the query comprises a modification of accessed data to be performed before responding to the first request.

14. The non-transitory computer-readable medium of claim 13, wherein the query comprises a condition under which the modification is to be performed.

15. A method comprising:
receiving, by one or more processors, a first request from an application for first data stored in a first JavaScript Object Notation (JSON) resource;
accessing, by the one or more processors, a first configuration file that defines first rules for accessing the first JSON resource, the first configuration file comprising a keyword that specifies a beginning of a query that comprises a named section, the named section comprising a Jayway path that, when executed, returns a list of instances, each instance of the list of instances corresponding to a JSON object, the query comprising a repetition of the keyword to specify a beginning of a subquery;
accessing, by the one or more processors, the first data from the first JSON resource according to the first rules;
responding to the first request with the first data;
receiving a second request from the application for second data stored in a second JSON resource, the second JSON resource being a modified version of the first JSON resource;
accessing a second configuration file that defines second rules for accessing the second JSON resource; and
responding to the second request with the second data.

16. The method of claim 15, wherein the named section comprises a list of attributes to be extracted from the JSON resource.

17. The method of claim 15, wherein the subquery identifies attributes to be extracted from the JSON objects corresponding to the instances in the list of instances.

18. The method of claim 15, wherein the query comprises:
a first set of attributes to be accessed from the first JSON resource when a first condition is met; and
a second set of attributes to be accessed from the first JSON resource when the first condition is not met.

19. The method of claim 15, wherein the query comprises a modification of accessed data to be performed before responding to the first request.

20. The method of claim 19, wherein the query comprises a condition under which the modification is to be performed.

* * * * *